(12) United States Patent
Lin (10) Patent No.: US 8,400,764 B1
(45) Date of Patent: Mar. 19, 2013

(54) DISPLAY UNIT WITH STORAGE FEATURE

(75) Inventor: Jeffrey Lin, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,967

(22) Filed: Sep. 28, 2011

(51) Int. Cl.
*H05K 7/00* (2006.01)

(52) U.S. Cl. .......... 361/679.24; 361/679.01; 361/679.02

(58) Field of Classification Search ............. 361/679.24, 361/679.01–679.02; 359/601–602, 611–614; 400/713–714; 348/818, 834, 835, 841, 842
See application file for complete search history.

(56) References Cited

U.S. PATENT DOCUMENTS

| | | | | |
|---|---|---|---|---|
| 4,834,330 | A * | 5/1989 | Swillinger | 248/205.2 |
| 5,796,577 | A * | 8/1998 | Ouchi et al. | 361/679.09 |
| 5,856,819 | A * | 1/1999 | Vossler | 345/102 |
| 5,909,315 | A | 6/1999 | Keehn | |
| 6,125,525 | A * | 10/2000 | Brock | 29/525.01 |
| 6,137,548 | A * | 10/2000 | Uchida et al. | 348/818 |
| 6,152,567 | A * | 11/2000 | LaForgia | 359/609 |
| 6,469,752 | B1 * | 10/2002 | Ishikawa et al. | 348/834 |
| 6,731,416 | B2 | 5/2004 | Hazzard | |
| 7,016,183 | B2 * | 3/2006 | Takemoto et al. | 361/679.07 |
| 7,266,176 | B2 * | 9/2007 | Allison et al. | 378/65 |
| 7,466,306 | B2 * | 12/2008 | Connor et al. | 345/169 |
| 7,545,341 | B2 * | 6/2009 | Brask | 345/1.1 |
| 7,688,281 | B2 * | 3/2010 | Watanabe | 345/32 |
| 7,688,282 | B2 * | 3/2010 | Motoe | 345/32 |
| 7,903,080 | B2 * | 3/2011 | Yuuki et al. | 345/102 |
| 2004/0150584 | A1 * | 8/2004 | Chuman et al. | 345/6 |
| 2005/0094362 | A1 * | 5/2005 | Stephens | 361/681 |
| 2006/0198088 | A1 | 9/2006 | Anderson et al. | |
| 2007/0024605 | A1 * | 2/2007 | Motoe | 345/204 |
| 2007/0030633 | A1 * | 2/2007 | Tseng | 361/681 |
| 2007/0097048 | A1 * | 5/2007 | Watanabe | 345/87 |
| 2007/0121020 | A1 * | 5/2007 | Ichimura | 348/739 |
| 2007/0253065 | A1 * | 11/2007 | Doczy et al. | 359/601 |
| 2011/0051327 | A1 | 3/2011 | Yang et al. | |
| 2011/0216415 | A1 | 9/2011 | Engblom et al. | |

OTHER PUBLICATIONS

Non-Final Office Action for U.S. Appl. No. 13/279,756, mailed Feb. 24, 2012, 10 pages.
Non-Final Office Action Response for U.S. Appl. No. 13/279,756, filed May 17, 2012, 8 pages.
Notice of Allowance for U.S. Appl. No. 13/279,756, mailed Jun. 13, 2012, 12 pages.

* cited by examiner

*Primary Examiner* — Hung S Bui
(74) *Attorney, Agent, or Firm* — Brake Hughes Bellermann LLP (57) ABSTRACT

A device includes a display unit, a first coupler, and a second coupler. The display unit is configured to provide a visual display to a user of the device. The display unit has a first side portion and a second side portion. The first coupler is disposed on the first side portion of the display unit. The first coupler is configured to removably couple a filter to the first side portion of the display unit. The second coupler is disposed on the second side portion of the display unit. The second coupler is configured to removably couple the filter to the second side portion of the display unit.

20 Claims, 6 Drawing Sheets

DISPLAY UNIT WITH STORAGE FEATURE

TECHNICAL FIELD

This description relates a display unit, such as a display unit of a laptop computer or a notebook computer that is configured to receive and store a filter, such as a privacy filter.

BACKGROUND

Electronic devices that include display units that produce visual outputs, such as laptop computers, are frequently used in public places. The visual outputs generated from such device may be private or confidential and the intended recipient of the visual output of device (such as the user of the device) may not want others to view the visual output. Additionally, the visual output may be disruptive to those not using the device.

Filters, such as privacy filters, are used to limit or dampen the visual output produced by electronic devices. For example, a user of an electronic device may place a privacy filter proximate a display unit of an electronic device when the user desires to limit the range or projection angle of the visual output. According, the visual output may be limited so as to limit the number of unintended recipients. Some filters are configured to be coupled to the electronic device such that the filter is disposed adjacent the display unit. However, known electronic devices do not include a storage location to place the filter when the user desires to use the electronic device without the use of the filter.

Thus, it is desirable to provide an electronic device that includes a storage location to house the filter when the filter is not in use with the electronic device.

SUMMARY

In one implementation, a device includes a display unit, a first coupler, and a second coupler. The display unit is configured to provide a visual display to a user of the device. The display unit has a first side portion and a second side portion. The first coupler is disposed on the first side portion of the display unit. The first coupler is configured to removably couple a filter to the first side portion of the display unit. The second coupler is disposed on the second side portion of the display unit. The second coupler is configured to removably couple the filter to the second side portion of the display unit.

In one implementation, a device includes a display member and a housing. The display member is configured to provide a visual display to a user of the device. The housing has a first side portion and a second side portion. The display member is disposed on the first side portion of the housing. The first side portion of the housing includes a first coupler configured to removably couple a filter to the first side portion of the housing. The second side portion of the housing includes a second coupler configured to removably couple the filter to the second side portion of the housing In another implementation, a method of storing a filter, includes grasping the filter; removing the filter from a first coupling member disposed on a first side portion of a display unit; and coupling the filter to a second coupling member disposed on a second side portion of the display unit.

DETAILED DESCRIPTION

Figure 1:
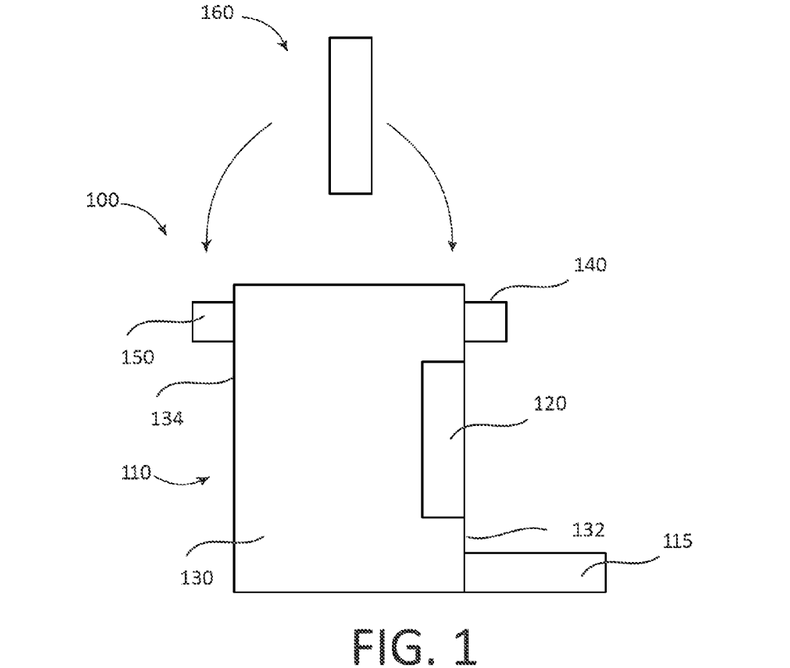
FIG. 1 is a schematic diagram of an example device according to an implementation.

FIG. 1 is a schematic diagram of a device 100. The device may be any type of device that is configured to produce or emit a visual output. For example, in some implementations, the device 100 is a computer, such as a laptop computer. In other implementations, the device 100 is another device that is configured to produce or emit a visual output. In some implementations, the device 100 is portable. In other words, in some implementations, the device 100 is sized such that a user may carry or easily transport the device 100. In other implementations, the device 100 is not easily portable and is configured to remain in a single location. In other words, in such implementations, the device 100 is sized such that it is too large or too heavy for a user to easily carry or transport the device 100.

The device 100 includes a display unit 110 and an input unit 115. The input unit 115 may be any type of mechanism that is configured to receive an input from a user, such as a keyboard or other mechanism. The display unit 110 includes a display member 120 and a housing 130.

The housing 130 has a first side portion 132 and a second side portion 134. In some implementations, the first side portion 132 is disposed opposite the second side portion 134. A first coupling member 140 is disposed on or coupled to the first side portion 132 of the housing 130. A second coupling member 150 is disposed on or coupled to the second side portion 134 of the housing 130.

The first coupling member 140 is configured to removably couple a filter 160 to the first side portion 132 of the housing 130. In some implementations, the first coupling member 140 defines a slot or a groove that is configured to removably receive the filter 160 to couple the filter 160 to the first side portion 132 of the housing 130. In some implementations, the first coupling member includes a projection or a tab (or a plurality of projections or tabs) that collectively with a portion of the first side portion 132 of the housing 130 (such as a portion of the surface of the first side portion 132) defines a slot or a groove that is configured to receive a portion of the filter 160 to removably couple the filter 160 to the first side portion 132 of the housing 130. In other implementations, the first coupling member 140 includes a snap, a clip, or other type of coupling mechanism that is configured to removably couple the filter 160 to the first side portion 132 of the housing 130.

In some implementations, the first coupling member 140 includes a tab that extends along an entire length or substantially along an entire length of an edge portion of the first side portion 132 of the housing 130. In some implementations, the first coupling member 140 includes a tab that extends along the length of three side portion or substantially along the entire length of three side portions of the first side portion 132 of the housing 130 (such as a first side edge portion, a bottom edge portion, and a second side edge portion).

In some implementations, the first coupling member 140 is coupled to the first side portion 132 of the housing 130 via glue, an adhesive, or other type of coupling mechanism. In other implementations, the first coupling member 140 is unitarily or monolithically formed with the housing 130. In other words, the first coupling member 140 may be formed with or molded to the housing 130.

The second coupling member 150 is configured to removably couple the filter 160 to the second side portion 134 of the housing 130. In some implementations, the second coupling member 150 defines a slot or a groove that is configured to removably receive the filter 160 to couple the filter 160 to the second side portion 134 of the housing 130. In some implementations, the second coupling member 150 includes a projection or a tab (or a plurality of projections or tabs) that collectively with a portion of the second side portion 134 of the housing 130 (such as a portion of the surface of the second side portion 134) defines a slot or a groove that is configured to receive a portion of the filter 160 to removably couple the filter 160 to the second side portion 134 of the housing 130. In other implementations, the second coupling member 150 includes a snap, a clip, or other type of coupling mechanism that is configured to removably couple the filter 160 to the second side portion 134 of the housing 130.

In some implementations, the second coupling member 150 includes a tab that extends along an entire length or substantially along an entire length of an edge portion of the first side portion 134 of the housing 130. In some implementations, the second coupling member 150 includes a tab that extends along the length of three side portion or substantially along the entire length of three side portions of the second side portion 134 of the housing 130 (such as a first side edge portion, a bottom edge portion, and a second side edge portion).

In some implementations, the second coupling member 150 is coupled to the second side portion 134 of the housing 130 via glue, an adhesive, or other type of coupling mechanism. In other implementations, the second coupling member 150 is unitarily or monolithically formed with the housing 130. In other words, the second coupling member 150 may be formed with or molded to the housing 130.

In some implementations, the housing 130 is formed of a single piece of material or from a single molding process. In other implementations, the housing 130 is formed by coupling a plurality of pieces of material together.

The display member 120 is configured to provide a visual output to a user. For example, in some implementations, the display member 120 is a computer screen or display. In other implementations, the display member is another device that provides a visual output or display to a user.

In the illustrated implementations, the display member 120 is coupled to or disposed at the first side portion 132 of the housing 130. For example, in some implementations, the first side portion 132 extends around or frames the display member 120.

In the illustrated implementations, the input unit 115 extends from, or is disposed adjacent to, the first side portion 132 of the housing 130. In such implementations, a user may be able to interact with the input unit 115 while viewing the output of the display member 120. In some implementations, the input unit 115 is configured to wirelessly communicate with the display unit 110.

The filter 160 is configured to modify or adjust the visual output of the display member 120. For example, in some implementations, the filter 160 is configured to be disposed between the display member 120 and a user of the device 100 to modify the visual output of the display member 120 as it is received by the user.

In some implementations, the filter 160 is a privacy filter. For example, in some implementations, the filter 160 is configured to limit the viewing angle of the display member 120. In other words, in some implementations, the filter 160 is configured to limit or narrow the angle at which the display member 120 may be viewed. In such implementations, the filter 160 is configured to narrow the viewing angle (or the angle at which the display member 120 may be viewed by a user and still receive the output of the display member 120) such that only people disposed directly or substantially directly in front of the display member 120 may receive the visual output provided by the display member 120. In other implementations, the filter 160 is configured to dim, soften, or otherwise modify the output of the display member 120. In yet other implementations, the filter 160 is another type of filter, such as an enhancement filter that is configured to enhance or otherwise modify the output of the display member 120.

In some implementations, the second side portion 134 of the housing 130 may include a display item. For example, a symbol, shape, letter, word, or other character may be disposed on a surface of the second side portion 134 of the housing 130. In some implementations, the filter 160 is configured to alter the perception of the display item when the filter 160 is coupled to the second side portion 134 of the housing 130. For example, in some implementations, the display item may have a first color when viewed without the filter and may be of a second color when viewed through the filter. In other implementations, the display item or a portion of the display item may become visible when viewed through the filter (and is not visible when viewed without the filter).

In some implementations, the filter 160 includes a screen and a frame. In such implementations, the screen may be configured to modify or adjust the visual output of the display member 120. The frame may be configured to provide support to the screen and may provide a grasping location for the user. Thus, the user may grasp or otherwise handle the filter 160 using the frame so as to avoid touching the screen (and potentially making the screen dirty). Additionally, the frame or a portion of the frame may be configured to engage the coupling members 140 and 150 to help removably couple the filter 160 to the housing 130.

In some implementations, the first coupling member 140 is configured to couple the filter 160 to the first side portion 132 of the housing 130 such that the filter 160 is disposed adjacent the display member 120. For example, the first coupling member 140 may be configured to couple the filter 160 to the first side portion 132 of the housing 130 such that the filter is disposed between the display member 120 and a user of the device. In such implementations, a user may couple the filter 160 to the first side portion 132 of the housing 130 when the user desires to modify the output of the display member 120 (for example, when the user is using the device 100 in a public location) and may couple the filter 160 to the second side portion 134 of the housing 130 when the user desires to store the filter 160 (and be able to view the output of the display member 120 without the modifications of the filter 160).

In some implementations, the first coupling member 140 and the second 150 are configured to slidably receive the filter 160 from a location above the housing 130. In other implementations, the first coupling member 140 and the second coupling member 150 are configured to slideably receive the filter 160 from a location to the side of the housing 130.

Figure 2A:
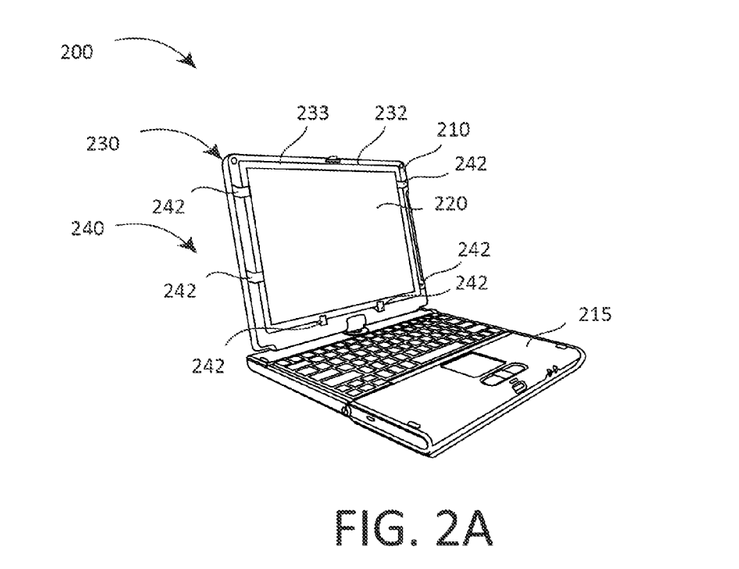
FIG. 2A is a perspective view of a device according to an implementation.

FIGS. 2A, 2B, and 4-7 illustrate a device 200 according to an implementation. FIG. 3 illustrates a filter 260 according to an implementation. The device may be any type of device that is configured to produce or emit a visual output. For example, as illustrated, the device 200 is a laptop computer or portable computer. In other implementations, the device 200 is another device that is configured to produce or emit a visual output.

The device 200 includes a display unit 210 and an input unit 215. The input unit 215 includes a keyboard and a touch pad. In other implementations, the input unit 215 may be any type of mechanism that is configured to receive an input from a user. The display unit 210 includes a display member 220 and a housing 230.

The housing 230 has a first side portion 232 and a second side portion 234. As illustrated, the first side portion 232 is a front side portion and is disposed opposite the second (rear) side portion 234. A first coupling member 240 is disposed on or coupled to the first side portion 232 of the housing 230. A second coupling member 250 is disposed on or coupled to the second side portion 234 of the housing 230.

The first coupling member 240 is configured to removably couple the filter 260 to the first side portion 232 of the housing 230. In the illustrated implementation, the first coupling member 240 includes a plurality of projections or tabs 242. Each of the projections or tabs 242 collectively with a portion of the surface 233 of the first side portion 232 defines a slot or a groove that is configured to receive a portion of the filter 260 to removably couple the filter 260 to the first side portion 232 of the housing 230. Specifically, the filter 260 may be slid into the slots or grooves defined by each of the projections or tabs 242 and the surface 233 of the first side portion 232 to removably couple the filter 260 to the first side portion 232 of the housing 230.

In some implementations, the projections or tabs 242 of the first coupling member 240 are coupled to the first side portion 232 of the housing 230 via glue, an adhesive, or other type of coupling mechanism. In other implementations, projections or tabs 242 of the first coupling member 240 are unitarily or monolithically formed with the housing 230. In other words, for example, the projections or tabs 242 may be formed with or molded to the housing 230.

In the illustrated implementation, the first coupling member 240 includes a pair of projections or tabs 242 disposed along a first side edge portion of the first side portion 232, a pair of projections or tabs 242 disposed along a second side edge portion of the first side portion 232, and a pair of projections or tabs 242 disposed along a bottom edge of the first side portion 232.

Figure 2B:
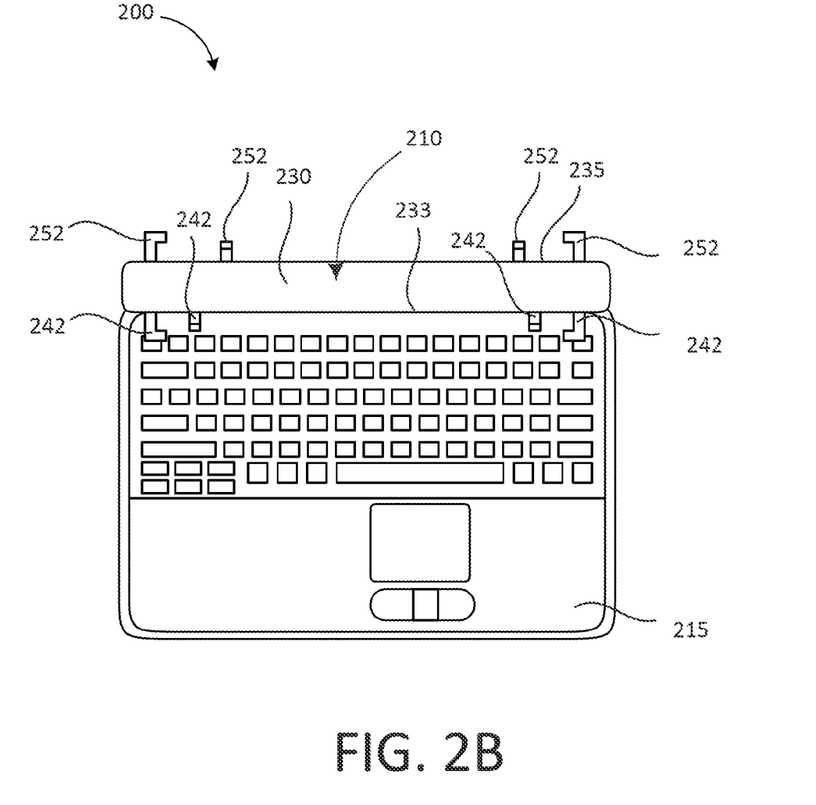
FIG. 2B is a top view of the device of FIG. 2A.
Figure 2C:
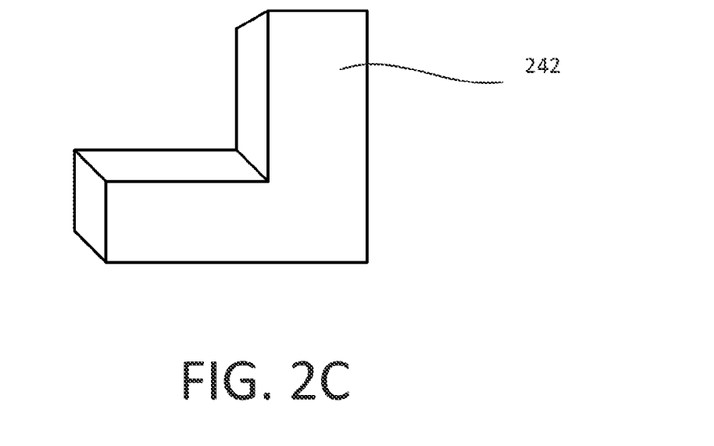
FIG. 2C is a perspective view of a projection or tab of the device of FIG. 2A.
Figure 3:
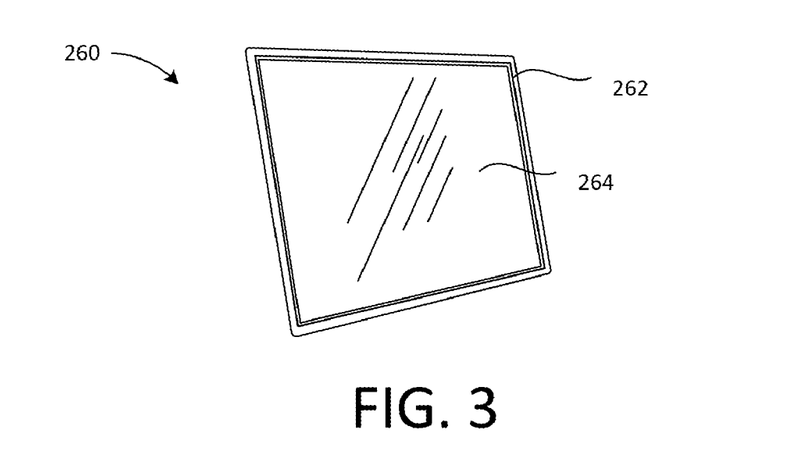
FIG. 3 is a perspective view of a filter according to an implementation.

As best illustrated in FIGS. 2B and 2C, the projections or tabs 242 are generally L shaped and extend from the housing 230. The projections or tabs 242 collectively define a slot or receiving portion configured to slidably receive the filter 260 and removably couple the filter 260 to the first side portion 232 of the housing 230. Specifically, the filter 260 may be slid or moved into the slot or receiving portion from the top edge portion of the first side portion 232. Once inserted into the slot or receiving portion, the filter 260 may rest on the projections or tabs disposed along the bottom edge portion of the first side portion 232. The projections or tabs 242 disposed along the side edge portions of the first side portion are configured to support or retain the filter 260 in place proximate the first side portion 232 of the housing 230.

In other implementations, the first coupling member 240 includes another number or configuration of projections or tabs disposed on or proximate to the first side portion 232 of the housing 230 to removably couple the filter 260 to the first side portion 232 of the housing 230. For example, in some implementations, the first coupling member 240 includes more than a pair of projections or tabs along a side edge of the first side portion 232 of the housing 230. In other implementations, the coupling member includes only one projection or tab along a side edge of the first side portion 232 of the housing 230.

In some implementations, the first coupling member 240 includes a projection or tab that extends along a side edge portion of the first side portion 232 and along a bottom edge portion of the first side portion 232.

The second coupling member 250 is configured to removably couple the filter 260 to the second side portion 234 of the housing 230. In the illustrated implementation, the second coupling member 250 includes a plurality of projections or tabs 252. Each of the projections or tabs 252, collectively with a portion of the surface 235 of the second side portion 234, defines a slot or a groove that is configured to receive a portion of the filter 260 to removably couple the filter 260 to the second side portion 234 of the housing 230. Specifically, the filter 260 may be slid into the slots or grooves defined by each of the projections or tabs 252 and the surface 235 of the second side portion 234 to removably couple the filter 260 to the second side portion 234 of the housing 230.

In some implementations, the projections or tabs 252 of the second coupling member 250 are coupled to the second side portion 234 of the housing 230 via glue, an adhesive, or other type of coupling mechanism. In other implementations, projections or tabs 252 of the second coupling member 250 are unitarily or monolithically formed with the housing 230. In other words, for example, the projections or tabs 252 may be formed with or molded to the housing 230.

In the illustrated implementation, the second coupling member 250 includes a pair of projections or tabs 252 disposed along a first side edge portion of the second side portion 234, a pair of projections or tabs 252 disposed along a second side edge portion of the second side portion 234, and a pair of projections or tabs 252 disposed along a bottom edge of the second side portion 234. The projections or tabs 252 collectively define a slot or receiving portion configured to slidably receive the filter 260 and removably couple the filter 260 to the second side portion 234 of the housing 230. Specifically, the filter 260 may be slid or moved into the slot or receiving portion from the top edge portion of the second side portion 234. Once inserted into the slot or receiving portion, the filter 260 may rest on the projections or tabs disposed along the bottom edge portion of the second side portion 234. The projections or tabs disposed along the side edge portions of the second side portion 234 are configured to support or retain the filter 260 in place proximate the second side portion 234 of the housing 230.

In other implementations, the second coupling member 250 includes another number or configuration of projections or tabs disposed on or proximate to the second side portion 234 of the housing 230 to removably couple the filter 260 to the second side portion 234 of the housing 230. For example, in some implementations, the second coupling member 250 includes more than a pair of projections or tabs along a side edge of the second side portion 234 of the housing 230. In other implementations, the second coupling member 250 includes only one projection or tab along a side edge of the second side portion 234 of the housing 230.

In some implementations, the second coupling member 250 includes a projection or tab that extends along a side edge portion of the second side portion 234 and along a bottom edge portion of the second side portion 234.

The display member 220 is configured to provide a visual output to a user. In the illustrated implementation, the display member 220 is a computer screen or display. The display member 220 is coupled to or disposed at the first side portion 232 of the housing 230. Specifically, a frame or edge portion of the first side portion 232 extends around or frames the display member 220.

The input unit 215 extends from or is disposed adjacent to the first side portion 232 of the housing 230. A user may be able to interact with the input unit 215 while viewing the output of the display member 220.

The filter 260 is configured to modify or adjust the visual output of the display member 220. For example, in some implementations, the filter 260 is configured to be disposed between the display member 220 and a user of the device 200 to modify the visual output of the display member 220 as it is received by the user.

In some implementations, the filter 260 is a privacy filter. For example, in some implementations, the filter 260 is configured to limit the viewing angle of the display member 220. In other words, in some implementations, the filter 260 is configured to limit or narrow the angle at which the display member 220 may be viewed. In such implementations, the filter 260 is configured to narrow the viewing angle (or the angle at which the display member 220 may be viewed by a user and still receive the output of the display member 220) such that only people disposed directly or substantially directly in front of the display member 220 may receive the visual output provided by the display member 220. In other implementations, the filter 260 is configured to dim, soften, or otherwise modify the output of the display member 220. In yet other implementations, the filter 260 is another type of filter, such as an enhancement filter that is configured to enhance or otherwise modify the output of the display member 220.

As best illustrated in FIG. 3, the filter 260 includes a screen 264 and a frame 262. The screen 264 is configured to modify or adjust the visual output of the display member 220. The frame 262 is configured to provide support to the screen 264 and may provide a grasping location for the user. Thus, the user may grasp or otherwise handle the filter 260 using the frame 262 so as to avoid touching the screen 264 (and potentially making the screen 264 dirty). Additionally, the frame 262 may be configured to engage the coupling members 240 and 250 to help removably couple the filter 260 to the housing 230. For example, in some implementations, the frame 262 is configured to frictionally engage the coupling member 240 and 250 or portions of the coupling members 240 and 250 (such as projections or tabs 242 or 252) to frictionally couple or snap the frame 262 in place. In other implementations, the frame 262 or other portion of the filter 260 may engage a snap or clip or other mechanism of the device 200 to help retain or couple the filter 260 in place.

Figure 4:
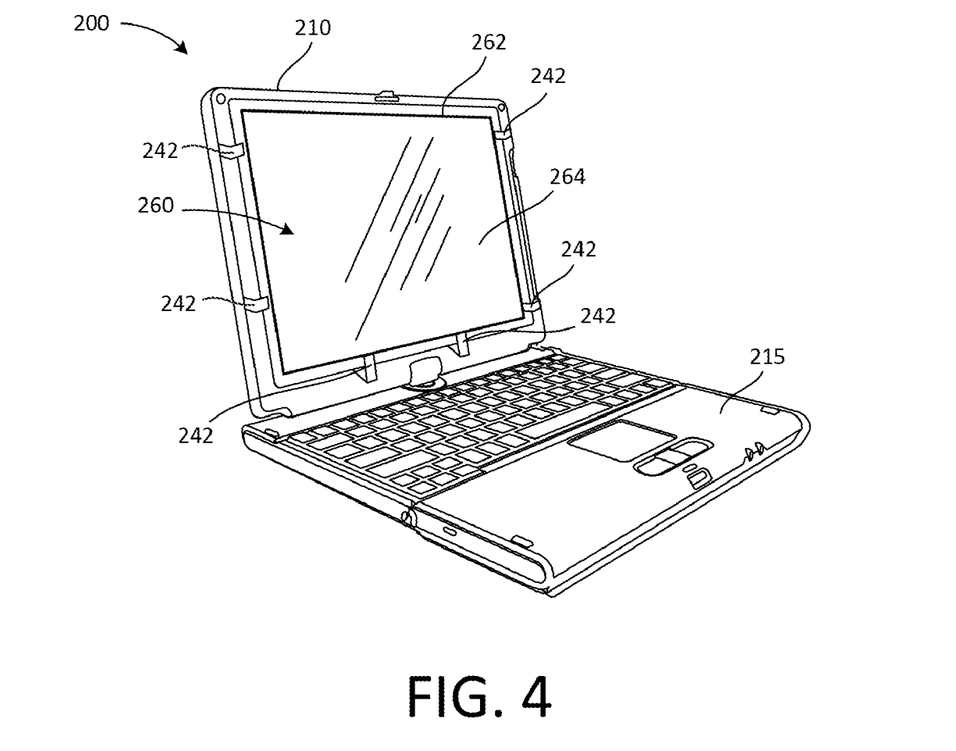
FIG. 4 is a perspective view of the device of FIG. 2A with the filter of FIG. 3 coupled to a first side portion of the device.
Figure 5:
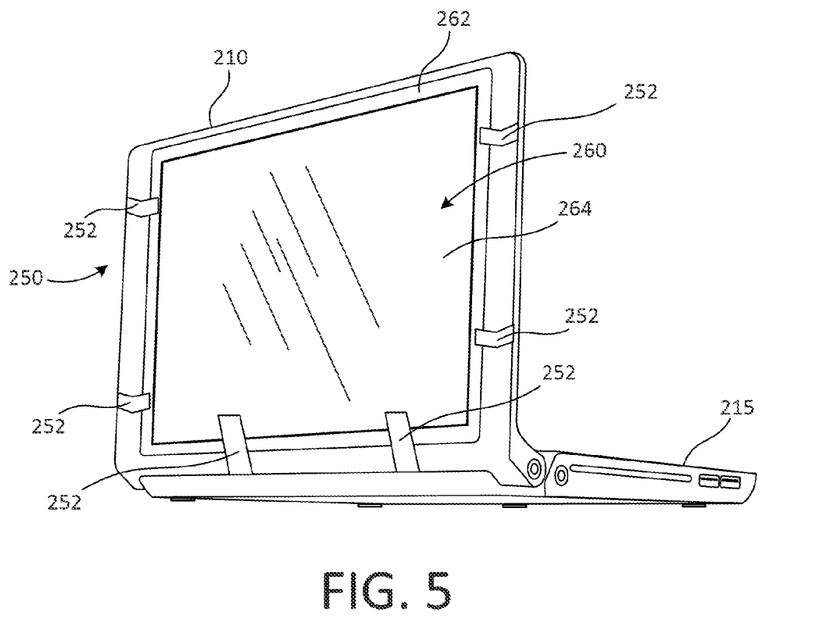
FIG. 5 is a perspective view of the device of FIG. 2A with the filter of FIG. 3 coupled to a second side portion of the device.
Figure 6:
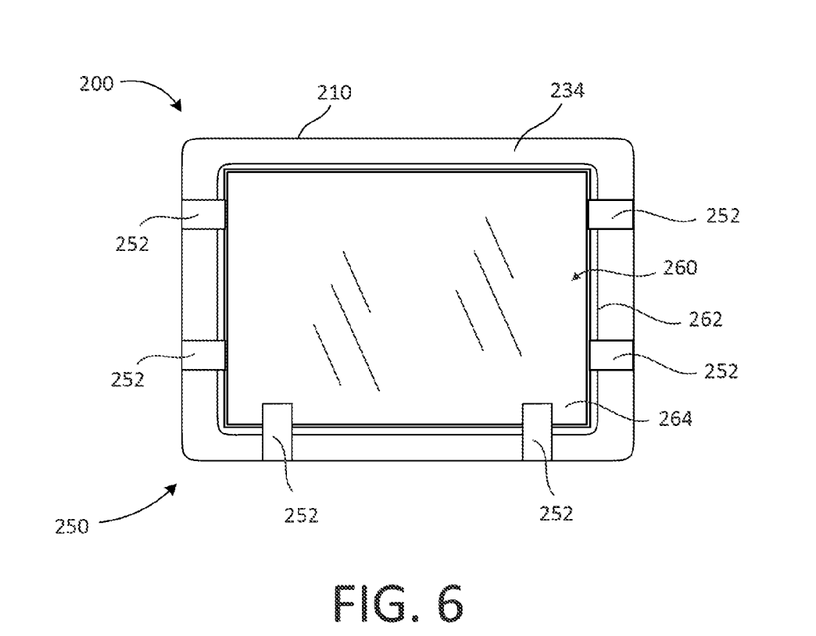
FIG. 6 is a rear view of the device of FIG. 2A with the filter of FIG. 3 coupled to a second side portion of the device.
Figure 7:
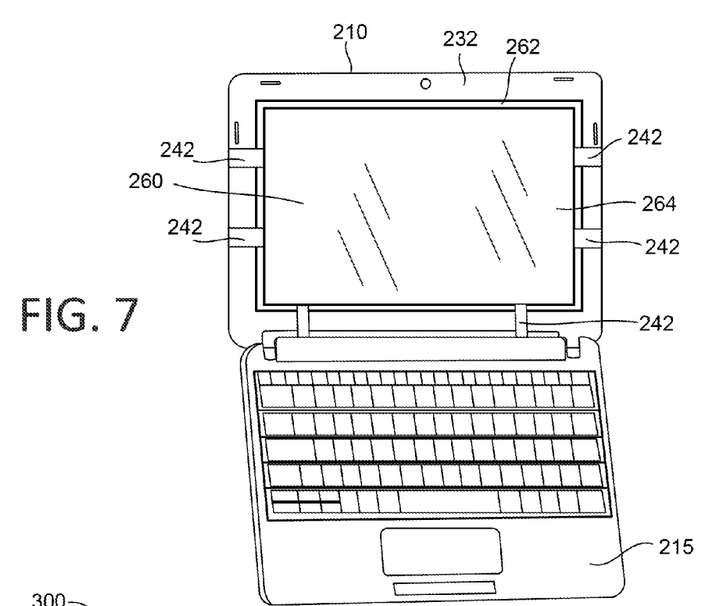
FIG. 7 is a front view of the device of FIG. 2A with the filter of FIG. 3 coupled to the first side portion of the device.

As best illustrated in FIG. 4, the first coupling member 240 is configured to couple the filter 260 to the first side portion 232 of the housing 230 such that the filter 260 is disposed adjacent the display member 220. Specifically, the first coupling member 240 is configured to couple the filter 260 to the first side portion 232 of the housing 230 such that the filter 260 is disposed between the display member 220 and a user of the device 200. Accordingly, a user may couple the filter 260 to the first side portion 232 of the housing 230 when the user desires to modify the output of the display member 220 (for example, when the user is using the device 200 in a public location) and may couple the filter 260 to the second side portion 234 of the housing 230 when the user desires to store the filter 260 (and be able to view the output of the display member 220 without the modifications of the filter 260).

Figure 8:
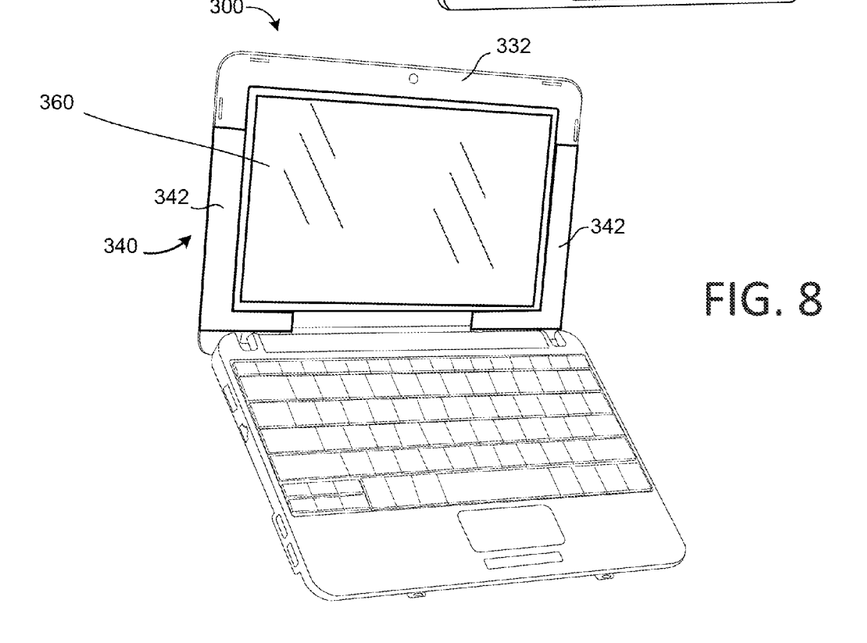
FIG. 8 is a perspective view of a device and filter according to another implementation.

FIG. 8 is a perspective view of a device 300 coupled to a filter 360 according to another implementation. The device 300 is a computing device, such as a laptop computer, and includes a first side portion 332 and a second side portion (not illustrated). The device 300 also includes a coupling member 340 that is configured to removably couple or retain the filter 360 to the first side portion 332 of the device 300. Specifically, the coupling member 340 is configured to removably couple the filter 360 to the first side portion 332 such that the filter 360 is disposed between a user of the device 300 and a display member 320 of the device 300.

The coupling member 340 includes two projections or tabs 342. Each of the projections or tabs 342 extend along a portion of a side edge portion of the first side portion 332 and along a portion of the bottom edge portion of the first side portion 332. The projections or tabs 342 define a groove or a slot that is configured to receive a portion of the filter 360 to removably couple the filter 360 to the first side portion 332 of the device 300. For example, the filter 360 may be slid or moved into the grove or slot defined by the projections or tabs 342 from a top edge portion of the first side portion 332. The filter 360 may rest on or be supported by the portions of the projections or tabs 342 that extend along a portion of the bottom edge portion of the first side portion 332.

Figure 9:
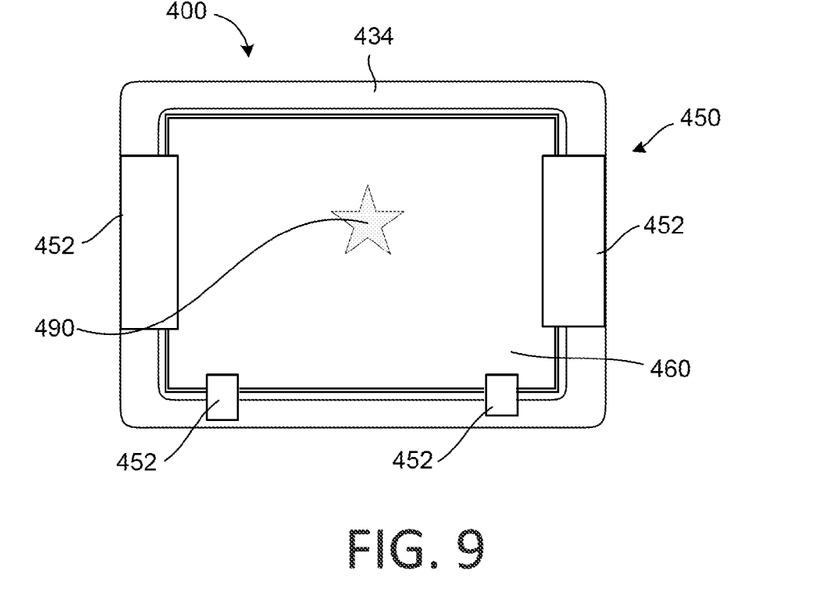
FIG. 9 is a rear view of a device and filter according to another implementation.

FIG. 9 is a rear view of a device 400 coupled to a filter 460 according to another implementation. The device 400 is a computing device, such as a laptop computer, and includes a first side portion (not illustrated) and a second side portion 434. The device 400 also includes a coupling member 450 that is configured to removably couple or retain the filter 460 to the second side portion 434 of the device 400. Specifically, the coupling member 450 is configured to removably couple the filter 460 to the second side portion 434 when the user desires to store the filter 460 (for example, when the filter 460 is not in use).

The coupling member 450 includes several projections or tabs 452. Two of the projections or tabs 452 each extend along a portion of the side edge portions of the second side portion 434. A pair of projections or tabs 452 are disposed proximate a bottom or lower edge portion of the second side portion 434. The projections or tabs 452 define a groove or a slot that is configured to receive a portion of the filter 460 to removably couple the filter 460 to the second side portion 434 of the device 400. For example, the filter 460 may be slid or moved into the grove or slot defined by the projections or tabs 452 from a top edge portion of the second side portion 434. The filter 460 may rest on or be supported by the projections or tabs 452 that are disposed proximate a bottom or lower edge portion of the second side portion 434.

In the illustrated implementation, the second side portion 434 includes a graphic or symbol 490. For example, in some implementations, a surface of the second side portion 434 includes the graphic or symbol 490. In some implementations, the filter 460 is configured to modify how a user or person view or observes the graphic or symbol 490. For example, in some implementations, the graphic or symbol 490 is not visible to the human eye unless the filter 460 is disposed between the graphic or symbol 490 and the human eye or user. In some implementations, the filter 460 is configured to alter the appearance of the graphic or symbol 490. For example, the filter 460 may alter the color of the graphic or symbol 490 or a portion of the graphic or symbol 490 as perceived by the user.

Figure 10:
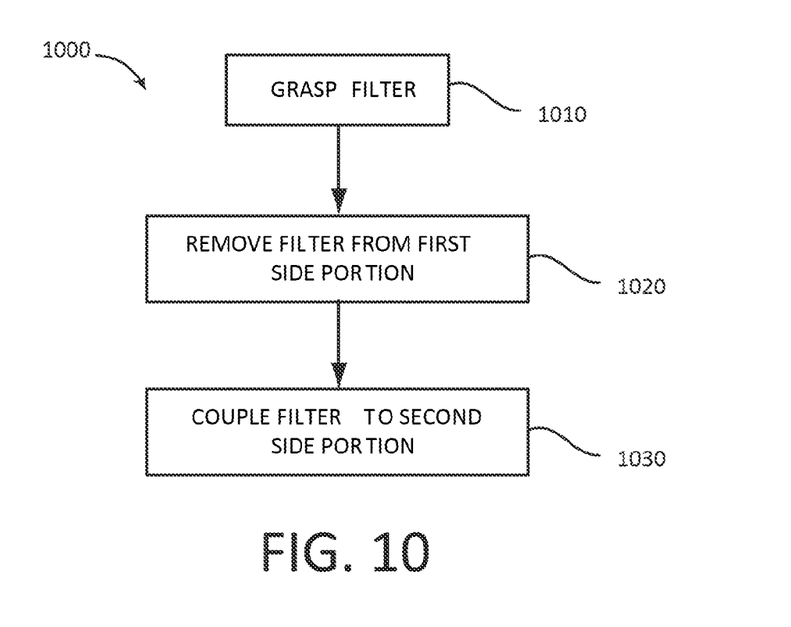
FIG. 10 is a flow chart illustrating a method of storing a filter.

FIG. 10 is a flow chart that illustrates a method 1000 according to an implementation. The method includes at 1010 grasping a filter. In some implementations, a user may grasp the filter at a frame portion of the filter so as to avoid contacting and potentially making a screen portion of the filter dirty. In some implementations, the user may use a hand of the user to grasp the filter.

At 1020, the user may remove the filter from a first side portion of a device such as a computing device that includes a display member. In some implementations, the removing of the filter includes removing the filter from a coupling portion of the first side portion of the device. Specifically, in some implementations, the removing the filter includes sliding the filter with respect to the first side portion of the device, such as sliding or moving the filter away from a slot or channel defined by projections or tabs of the coupling member of the first side portion of the device.

At 1030, the user may couple the filter to a second side portion of the device. In some implementations, the second side portion of the device is disposed opposite the first side portion of the device. In some implementations, the coupling of the filter to the second side portion of the device includes sliding or moving the filter into a slot or groove defined by projections or tabs of a coupling member disposed or extending from the second side portion of the device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A device, comprising:
a display unit having a single display member configured to provide a visual display to a user of the device, the display unit having a first side portion and a second side portion, the display member being disposed on the first side portion of the display unit;
a first coupler disposed on the first side portion of the display unit, the first coupler being configured to removably couple a filter to the first side portion of the display unit; and
a second coupler disposed on the second side portion of the display unit, the second coupler being configured to removably couple the filter to the second side portion of the display unit.

2. The device of claim 1, wherein the first side portion is disposed opposite the second side portion.

3. The device of claim 1, wherein the first coupler includes a tab.

4. The device of claim 1, wherein the first coupler includes a tab, the tab and a portion of a surface of the first side portion of the display unit define a slot configured to receive at least a portion of the filter.

5. The device of claim 1, wherein the first coupler includes a tab and the second coupler includes a tab.

6. The device of claim 1, wherein the first coupler includes a tab that is unitarily formed with at least a portion of a surface of the first side portion of the display unit, the second coupler includes a tab that is unitarily formed with at least a portion of a surface of the second side portion of the display unit.

7. The device of claim 1, wherein the first coupler includes a first tab, a second tab, and a third tab, the first tab is disposed proximate a first edge portion of a surface of the first side portion of the display unit, the second tab is disposed proximate a second edge portion of the surface of the first side portion of the display unit, and the third tab is disposed proximate a third edge portion of the surface of the first side portion of the display unit.

8. The device of claim 1, wherein the first coupler is fixedly coupled to the first side portion of the display unit and the second coupler is fixedly coupled to the second side portion of the display unit.

9. A device, comprising:
a display member configured to provide a visual display to a user of the device; and
a housing having a first side portion and a second side portion, the display member being disposed on the first side portion of the housing, the first side portion of the housing including a first coupler configured to removably couple a filter to the first side portion of the housing when the filter is in a use mode, the second side portion of the housing including a second coupler configured to removably couple the filter to the second side portion of the housing when the filter is in a storage mode.

10. The device of claim 9, wherein the first side portion of the housing is disposed opposite the second side portion of the housing.

11. The device of claim 9, wherein the first coupler includes a slot configured to receive at least a portion of the filter to help removably couple the filter to the first side portion of the housing.

12. The device of claim 9, wherein the first coupler includes a tab.

13. The device of claim 9, wherein the first coupler includes a tab, the tab and a portion of a surface of the first side portion of the display member define a slot configured to receive at least a portion of the filter.

14. The device of claim 9, wherein the first coupler includes a first tab, a second tab, and a third tab, the first tab is disposed proximate a first edge portion of a surface of the first side portion of the housing, the second tab is disposed proximate a second edge portion of the surface of the first side portion of the housing, and the third tab is disposed proximate a third edge portion of the surface of the first side portion of the housing.

15. The device of claim 9, wherein the first coupler includes a tab that is unitarily formed with at least a portion of a surface of the first side portion of the housing, the second coupler includes a tab that is unitarily formed with at least a portion of a surface of the second side portion of the housing.

16. The device of claim 9, wherein the first coupler is fixedly coupled to the first side portion of the housing and the second coupler is fixedly coupled to the second side portion of the housing.

17. A device, comprising:
a display unit configured to provide a visual display to a user of the device, the display unit having a first side portion and a second side portion;
a first coupler disposed on the first side portion of the display unit, the first coupler being configured to removably couple a filter to the first side portion of the display unit, the first coupler including a plurality of coupling members, the coupling members of the first coupler being disposed adjacent no more than three edge portions of the first side portion of the display unit; and a second coupler disposed on the second side portion of the display unit, the second coupler being configured to removably couple the filter to the second side portion of the display unit, the second coupler including a plurality of coupling members, the coupling members of the second coupler being disposed adjacent no more than three edge portions of the second side portion of the display unit.

18. The device of claim 17, wherein the first coupler includes a first coupling member disposed adjacent a first edge portion of the first side portion of the display unit, a second coupling member disposed adjacent a second edge portion of the first side portion of the display unit, and a third coupling member disposed adjacent a third edge portion of the first side portion of the display unit, the first coupler defines a slot and is configured to receive the filter from a location adjacent a fourth edge portion of the first side portion of the display unit.

19. The device of claim 17, wherein the plurality of coupling members of the first coupler are fixedly coupled to the first side portion of the display unit and the plurality of coupling members of the second coupler are fixedly coupled to the second side portion of the display unit.

20. The device of claim 17, wherein the plurality of coupling members of the first coupler are unitarily formed with at least a portion of the surface of the first side portion of the display unit and the plurality of coupling members of the second coupler are unitarily formed with at least a portion of the surface of the second side portion of the display unit.

\* \* \* \* \*